(12) United States Patent
Thimsen et al.

(10) Patent No.: US 11,862,153 B1
(45) Date of Patent: Jan. 2, 2024

(54) SYSTEM FOR RECOGNIZING AND RESPONDING TO ENVIRONMENTAL NOISES

(71) Applicant: Amazon Technologies, Inc., Seattle, WA (US)

(72) Inventors: John Daniel Thimsen, Seattle, WA (US); Gregory Michael Hart, Mercer Island, WA (US); Ryan Paul Thomas, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 16/578,838

(22) Filed: Sep. 23, 2019

Related U.S. Application Data

(63) Continuation of application No. 13/830,222, filed on Mar. 14, 2013, now Pat. No. 10,424,292.

(51) Int. Cl.
*G10L 15/20* (2006.01)
*G10L 21/00* (2013.01)
*G10L 21/06* (2013.01)

(52) U.S. Cl.
CPC .................................. *G10L 15/20* (2013.01)

(58) Field of Classification Search
CPC ............................... G10L 21/00; G10L 21/06
See application file for complete search history.

(56) References Cited

U.S. PATENT DOCUMENTS

| 5,909,666 | A | 6/1999 | Gould et al. |
| 6,411,927 | B1 | 6/2002 | Morin et al. |
| 6,988,070 | B2 | 1/2006 | Kawasaki et al. |
| 7,418,392 | B1 | 8/2008 | Mozer et al. |
| 7,440,891 | B1 | 10/2008 | Shozakai et al. |
| 7,451,085 | B2 | 11/2008 | Rose et al. |
| 7,457,750 | B2 | 11/2008 | Rose et al. |
| 7,676,363 | B2 | 3/2010 | Chengalvarayan et al. |
| 7,720,683 | B1 | 5/2010 | Vermeulen et al. |
| 7,774,204 | B2 | 8/2010 | Mozer et al. |
| 7,826,945 | B2 | 11/2010 | Zhang et al. |
| 2002/0059068 | A1 | 5/2002 | Rose et al. |
| 2002/0135618 | A1 | 9/2002 | Maes et al. |

(Continued)

FOREIGN PATENT DOCUMENTS

WO    WO2011088053 A2    7/2011

OTHER PUBLICATIONS

Office Action for U.S. Appl. No. 13/830,222, dated Oct. 25, 2017, Thimsen, "System for Recognizing and Responding to Environmental Noises", 7 pages.

(Continued)

*Primary Examiner* — Michael N Opsasnick
(74) *Attorney, Agent, or Firm* — Lee & Hayes, P.C.

(57) ABSTRACT

An audio controlled assistant captures environmental noise and converts the environmental noise into audio signals. The audio signals are provided to a system which analyzes the audio signals for a plurality of audio prompts, which have been customized for the acoustic environment surrounding the audio controlled assistant by an acoustic modeling system. The system configured to detect the presence of an audio prompt in the audio signals and transmit instructions associated with the detected audio prompt to at least one of the audio controlled assistant or one or more cloud based services, in response.

20 Claims, 6 Drawing Sheets

(56) References Cited

U.S. PATENT DOCUMENTS

| | | |
|---|---|---|
| 2003/0191638 A1 | 10/2003 | Droppo et al. |
| 2005/0058266 A1* | 3/2005 | Krause .................. H04M 3/02 |
| | | 379/142.06 |
| 2006/0291638 A1* | 12/2006 | Radziewicz ...... H04M 3/42017 |
| | | 379/211.01 |
| 2007/0021958 A1 | 1/2007 | Visser et al. |
| 2007/0055508 A1 | 3/2007 | Zhao et al. |
| 2007/0061725 A1* | 3/2007 | Isaac ................. H04N 21/2393 |
| | | 715/717 |
| 2007/0217436 A1* | 9/2007 | Markley ............ H04L 12/2834 |
| | | 370/401 |
| 2008/0057911 A1* | 3/2008 | Lauper .................. G06F 16/68 |
| | | 455/412.1 |
| 2009/0271188 A1 | 10/2009 | Agapi et al. |
| 2009/0271189 A1 | 10/2009 | Agapi et al. |
| 2009/0282874 A1 | 11/2009 | Lee et al. |
| 2010/0088093 A1 | 4/2010 | Lee et al. |
| 2010/0130198 A1 | 5/2010 | Kannappan et al. |
| 2010/0286490 A1 | 11/2010 | Koverzin |
| 2011/0032095 A1* | 2/2011 | Hicks, III ............. H04L 61/106 |
| | | 370/352 |
| 2011/0138064 A1* | 6/2011 | Rieger ................. H04N 21/433 |
| | | 707/715 |
| 2011/0153325 A1* | 6/2011 | Ballinger ............. G06F 40/284 |
| | | 704/235 |
| 2011/0208507 A1* | 8/2011 | Hughes .................. G06F 3/038 |
| | | 704/235 |
| 2011/0270517 A1 | 11/2011 | Benedetti |
| 2012/0084089 A1* | 4/2012 | Lloyd .................... G10L 15/20 |
| | | 704/500 |
| 2012/0087516 A1* | 4/2012 | Amin ...................... H03G 3/32 |
| | | 381/107 |
| 2012/0223885 A1 | 9/2012 | Perez |
| 2012/0259631 A1* | 10/2012 | Lloyd .................... G10L 15/20 |
| | | 704/E15.039 |
| 2013/0185065 A1 | 7/2013 | Tzirkel-Hancock et al. |
| 2013/0205329 A1* | 8/2013 | Markley ............ H04L 12/2872 |
| | | 725/93 |
| 2013/0216071 A1* | 8/2013 | Maher ...................... H04R 5/02 |
| | | 381/303 |
| 2015/0002808 A1* | 1/2015 | Rizzo, III .............. G02C 11/10 |
| | | 351/158 |

OTHER PUBLICATIONS

Non Final Office Action dated Dec. 17, 2018 for U.S. Appl. No. 13/830,222 "System for Recognizing and Responding to Environmental Noises" Thimsen, 7 pages.

Office action for U.S. Appl. No. 13/830,222 dated Mar. 10, 2017, Opsasnick et al., "System for Recognizing and Responding to Environmental Noises", 8 pages.

Office Action for U.S. Appl. No. 13/830,222, dated Mar. 20, 2015, John Daniel Thimsen, "System for Recognizing and Responding to Environmental Noises".

Office Action for U.S. Appl. No. 13/830,222, dated May 17, 2018, Thimsen, "System for Recognizing and Responding to Environmental Noises", 10 pages.

Office action for U.S. Appl. No. 13/830,222, dated May 19, 2016, Thimsen et al., "System for Recognizing and Responding to Environmental Noises", 10 pages.

Office action for U.S. Appl. No. 13/830,222 dated Sep. 10, 2015, Opsasnick et al., "System for Recognizing and Responding to Environmental Noises", 9 pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

SYSTEM FOR RECOGNIZING AND RESPONDING TO ENVIRONMENTAL NOISES

CROSS-REFERENCE TO RELATED APPLICATION(S)

This application is a continuation of and claims priority to U.S. patent application Ser. No. 13/830,222, now U.S. Pat. No. 10,424,292, filed on Mar. 14, 2013 and entitled "System for Recognizing and Responding to Environmental Noises," the entirety of which is incorporated herein by reference.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through audio control.

One drawback with this mode is that vocal interaction with computers are typically pre-programmed to recognize only specific generic spoken words or voice commands. This can be particularly problematic in the home environment, where the acoustic environment can vary broadly. Accordingly, there is a need for techniques to configure audio controlled devices to detect personalized audio commands for each particular acoustic environment in which an audio controlled device is placed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Overview

Figure 1:
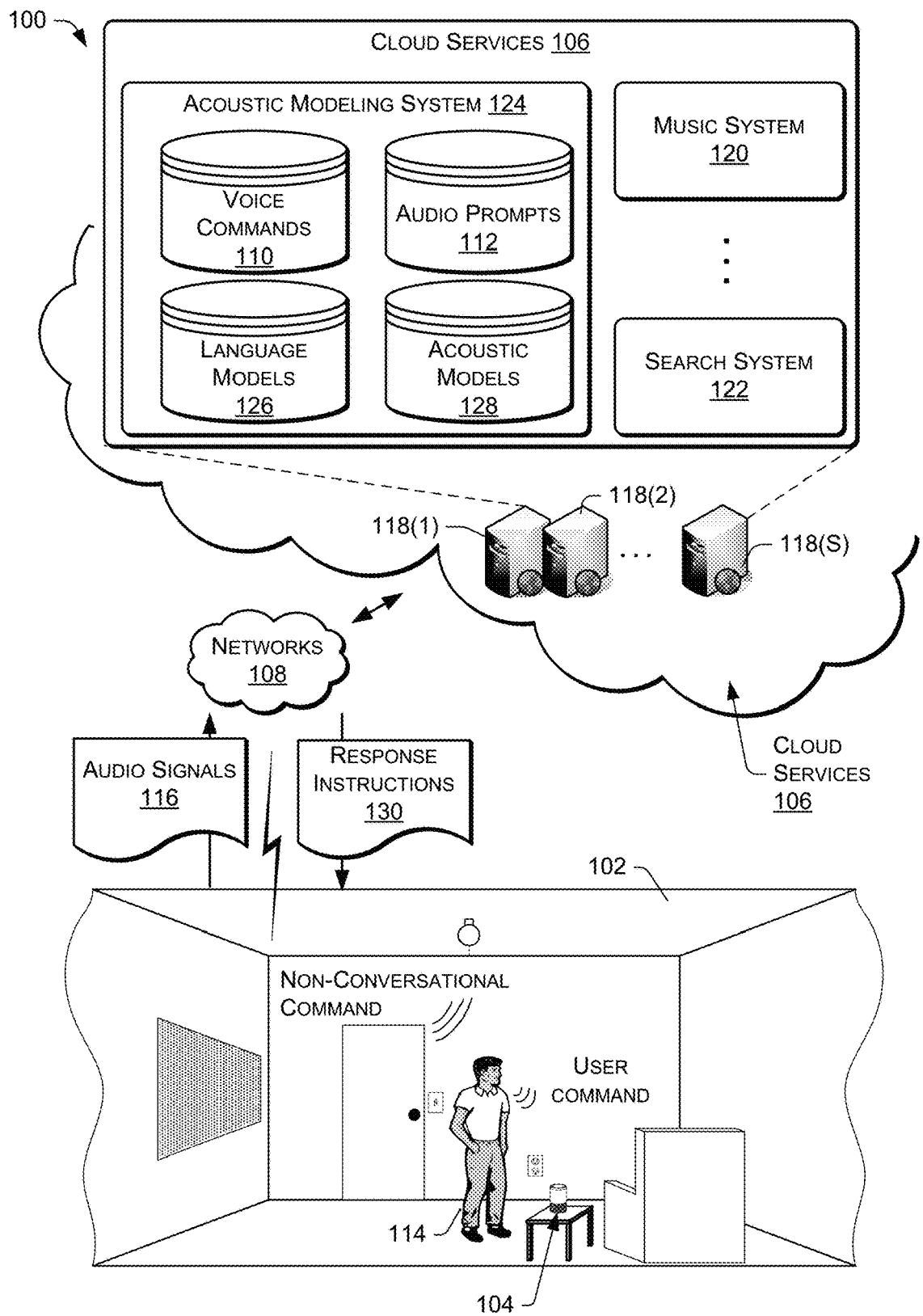
FIG. 1 illustrates an illustrative voice interaction computing architecture set in an exemplary home environment. The architecture includes an audio controlled assistant physically situated in the home, but communicatively coupled to remote cloud-based services accessible via a network.

This disclosure includes techniques and implementations to improve acoustic performance of an audio controlled assistant device. One way to improve acoustic performance is to personalize language models and acoustic models (used to analyze, isolate and respond to audio commands) for a given acoustic environment, such as a user's home. The audio controlled assistant is configured to detect and respond to audio commands. Audio commands include voice commands or words spoken by a user and audio prompt which are non-conversational noises. As used herein the "non-conversational noises" are sounds other than speech, which occur naturally in an environment. In one implementation, the non-conversational noises may be defined as audio signals that have no meaning within a selected vocabulary or dictionary. For instance, the audio controlled assistant may be configured for a selected language and the non-conversational noises may be discrete sounds that do not appear in a dictionary representative of the selected language. In some examples, the non-conversational noises may include door bell chimes, ring tones, footsteps, dog barks, noise related to an appliance, etc. The audio prompts are non-conversational noises, which have been designated to elicit specific responses from the audio controlled assistant. For example, the audio controlled assistant may designate a noise as an audio prompt in response to detecting the noise more than a pre-determined number of times and/or by determining the noise is within a threshold of similarity of prerecorded sounds.

In one implementation, the audio prompts are configured to elicit specific responses from the audio controlled assistant, in addition to the voice commands typically associated with such devices. For example, the audio controlled assistant may be configured to mute any active audio or pause the television in response to detecting an audio prompt associated with a baby crying. In another example, the audio controlled assistant may be configured to respond in a particular way to a first user's ring tone and in another way to a second user's ring tone. In this way the audio controlled assistant may be configure to respond to the each user's phone in a separate manner.

In another implementation, the language models associated with an audio controlled assistant may be configured to learn the differences between the voice profile of a first user, such as a parent, and a second user, such as a child, and to respond differently to voice commands initiated from the parent and voice commands initiated from the child. For example, the audio controlled assistant may be configured to aid the user in shopping online. In this example, the audio controlled assistant may be configured to accept a payment authorization from the parent but not from the child.

In an implementation, the audio controlled assistant may be configured to capture environmental noise from a room and to provide the environmental noise to a cloud based acoustic modeling system. The acoustic modeling system may be configured to utilize feedback loops or other machine learning techniques to analyze the captured environmental noise and personalize the language models and acoustic models used to detect audio commands for the transmitting audio controlled assistant. In this manner, each audio controlled assistant has its own particular language models and acoustic models, which are customized for the acoustic environment associated with the audio controlled assistant.

In one particular implementation, the acoustic modeling system may be configured to identify reoccurring or common noises and to categorize them as a particular type of noise. For example, the acoustic modeling system may identify a particular noise (such as a ring tone associated with a user's phone) and classify the particular noise as falling within a predefined category. Once the particular noise is identified and classified, the acoustic modeling system may define the particular noise as an audio prompt for the transmitting audio controlled assistant. Further, once defined as an audio prompt, future occurrences of the noise will cause the transmitting audio controlled assistant to respond in a particular manner based on the response instructions for the corresponding category.

By personalizing the language models and acoustic models associated with the audio controlled assistant for the specific acoustic environment, the audio commands and corresponding responses may be tailored to the lifestyle, languages, and dialects of the users and the acoustic environment.

Illustrative Environment

FIG. 1 shows an illustrative voice interaction computing architecture 100 set in an acoustic environment 102. The architecture 100 includes an audio controlled assistant 104 physically situated in a room of the home, and communicatively coupled to cloud-based services 106 over one or more networks 108.

In the illustrated implementation, the audio controlled assistant 104 is positioned on a table within the home in the acoustic environment 102. In other implementations, it may be placed in any number of places (e.g., an office, store, public place, etc.) or locations (e.g., ceiling, wall, in a lamp, beneath a table, under a chair, etc.). Further, more than one audio controlled assistant 104 may be positioned in a single room, or one audio controlled assistant 104 may be used to accommodate user interactions from more than one room of the home. In one particular example, the audio controlled assistant 104 may be configured to communicate with other home electronic devices to capture environmental noise and perform user requested actions.

The audio controlled assistant 104 may be communicatively coupled to the networks 108 via wired technologies (e.g., wires, USB, fiber optic cable, etc.), wireless technologies (e.g., RF, cellular, satellite, Bluetooth, etc.), or other connection technologies. The networks 108 are representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The networks 108 carry data, such as audio data, between the cloud services 106 and the audio controlled assistant 104.

The audio controlled assistant 104 is configured to respond to audio commands, including voice commands 110 and audio prompts 112, present in the acoustic environment 102. The voice commands 110 are specific spoken commands issued by one or more user to cause the audio controlled assistant 104 to perform one of a various list of tasks. The audio prompts 112 are non-conversational noises occurring in the acoustic environment 102, which the audio controlled assistant 104 is configured to responds to in addition to the voice commands 110.

The voice commands 110 and/or audio prompts 112 may cause the audio controlled assistant 104 to perform any number or type of operations. For example, the audio controlled assistant 104 may be configured to access cloud services 106 to perform database searches, locate and consume/stream entertainment (e.g., games, music, movies and/or other content, etc.), aid in personal management tasks (e.g., calendaring events, taking notes, etc.), assisting in online shopping, conducting financial transactions, and so forth.

The audio controlled assistant 104 also includes at least one microphone and at least one speaker to facilitate audio interactions with a user 114 and the acoustic environment 102. In some instances, the audio controlled assistant 104 is implemented without a haptic input component (e.g., keyboard, keypad, touch screen, joystick, control buttons, etc.) or a display. In other instances, a limited set of one or more haptic input components may be employed (e.g., a dedicated button to initiate a configuration, power on/off, etc.).

Generally, the audio controlled assistant 104 may be configured to capture environmental noises at the at least one microphone, generate corresponding audio or audio signals 116 and transmit the audio signals 116 to cloud services 106. The cloud services 106 detect and respond to voice commands 110 uttered from the user 114 and audio prompts 112 present in the acoustic environment 102. For example, the user 114 may speak voice commands 110 (e.g., specific commands such as "Awake" or "Sleep", or more conversational commands such as "I'd like to go to a movie. Please tell me what's playing at the local cinema."), which cause the audio controlled assistant 104 to perform tasks such as locating a list of currently playing movies.

The cloud services 106 generally refer to a network accessible platform implemented as a computing infrastructure of processors, storage, software, data access, and so forth that is maintained and accessible via a network such as the Internet. The cloud services 106 do not require end-user knowledge of the physical location and configuration of the system that delivers the services. Common expressions associated with cloud services include "on-demand computing", "software as a service (SaaS)", "platform computing", "network accessible platform", and so forth.

The cloud services 106 is implemented by one or more servers, such as servers 118(1), 118(2), . . . , 118(S). Additionally, the servers 118(1)-(S) may host any number of cloud based services 106, such as music system 120 or search system 122, which may process the voice commands 110 and audio prompts 112 received from the audio controlled assistant 104, and produce a suitable response, as discussed above. These servers 118(1)-(S) may be arranged in any number of ways, such as server farms, stacks, and the like that are commonly used in data centers.

The cloud services 106 also includes an acoustic modeling system 124, which is configured to select, generate, update and personalize the voice commands 110 and the audio prompts 112, in addition to the language models 126 and acoustic models 128 used to detect the voice commands 110 and the audio prompts 112. The acoustic modeling system 124 personalizes the voice commands 110, the audio prompts 112, the language models 126 and the acoustic models 128 for each audio controlled assistant 104 based on audio signals provided from the particular acoustical environment 102 in which the audio controlled assistant 104 providing the audio signals is placed.

The acoustic modeling system 124 is also configured to analyze the audio signals 116 using the language models 126 and the acoustic models 128 personalized for the audio controlled assistant 104 to determine if a voice command 110 or audio prompt 112 is present within the audio signals 116. In some examples, the audio prompts 112 may be combined with the voice commands 110. For instance, non-conversional noises such as laughter, crying, coughing, sneezing, etc. may be added to the language models 126 such that when the acoustic modeling system 124 analyzes the audio signals 116, the acoustic modeling system 124 detects the audio prompts as if they were spoken words recognizable in the language models 126.

Further, in response to detecting a voice command 110 or an audio prompt 112, the cloud services 106, the audio controlled assistant 104 or both perform corresponding actions. For example, in response to detecting a door bell chime the acoustic modeling system 124 may transmit responses instructions 130 to the audio controlled assistant 104 to cause the audio controlled assistant 104 to attenuate the audio being output by the audio controlled assistant 104. In another example, the acoustic modeling system 128 may cause the cloud services 106 to contact 911 in response to detecting an alarm siren of the home alarm system.

In one particular example, the audio controlled assistant 104 is introduced into a new environment (such as acoustic environment 102). For instance, when the audio controlled assistant is first installed in a room of user's 110 home. When first introduced into an environment, the audio controlled assistant 104 responds to preprogrammed voice commands 110 and audio prompts 112 based on one or more default language models 126 and acoustic models 128 tuned for the average acoustical environment.

As the audio controlled assistant 104 operates within the particular environment, however, the audio controlled assistant 104 generates audio signals 116 based on sound captured within the environment, including one or more user's voices and reoccurring or common noises, from the acoustic environment 102. The audio controlled assistant 104 transmits the audio signals 116 to a cloud based system, such as the acoustic modeling system 124. The acoustic modeling system 124 analyzes the audio signals 116 and, for example, applies model training methods, such as feedback loops or other machine learning techniques, to generate, select, adjust or personalize the language models 126 and the acoustic models 128 for the acoustic environment 102 based on the audio signals 116. For example, the acoustic modeling system 124 may apply speaker adaptation methods, vocal tract normalizations, or vocabulary adaptation techniques.

It should be understood, that as the language models 126 and the acoustic models 128 are personalized by acoustic molding system 124 the models 126 and 128 become more and more customized for the particular audio controlled assistant 104. As the models 126 and 128 are personalized, the acoustic modeling system 124 becomes better able to identify voice commands 110 spoken by one or more users and audio prompts 112 occurring in the acoustic environment 102 associated with the particular audio controlled assistant 104.

While performing the model training methods, the acoustic modeling system 124 is also configured to identify and generate personalized audio prompts 112 and, in some implementations, voice commands 110. For example, the acoustic modeling system 124 may be configured to identify reoccurring noises and/or words and to define the reoccurring words as additional voice commands 110 and the reoccurring noises as additional audio prompts 112. In at least one instance, the acoustic modeling system 124 may replace a given voice command 110 or audio prompt 112 with a sound signal originating in the acoustic environment 102. For example, the acoustic modeling system 124 may identify a particular song as a ring tone of the user 110 and may replace the audio prompt "ring ring" corresponding to a generic ring tone with the identified song.

In one particular implementation, the acoustic modeling system 124 may be configured to detect noises falling within predefined categories. For instance, the acoustic modeling system 124 may include a category for door bell rings which includes sound pattern templates for noises typically associated with door bells. The acoustic modeling system 124 may detect and isolate reoccurring noises from within the audio signals 116. For example the acoustic modeling system 124 may detect a reoccurring nose if it occurs more than a threshold number of time within a given period of time or if it occurs with a certain predefined level of periodicity. The acoustic modeling system 124 may then compare the sound pattern associated with reoccurring noise to the sound pattern templates of each category. If the acoustic modeling system 124 determines a match then the acoustic modeling system 124 defines the reoccurring noise as an audio prompt 112 within the matching category. In one example, a match may occur when the sound pattern of the noise and the sound pattern template are within a threshold of similarity to each other.

In some example, the reoccurring noise may be so particular to the acoustic environment 102 that the acoustic modeling system 124 is unable to match the sound patterns of the reoccurring noise to any of the templates. In this example, each category may also include sound pattern templates of sounds typically associated with noise of the category. For example in the case of the door bell category, the acoustic modeling system 124 may recognize the sound pattern associated with opening a door, such as a "creaking" or the words "hello" or "hi" regularly found in close proximity within the reoccurring noise. And thus, the acoustic modeling system 124 may associate the reoccurring noise with the door bell category, even if the acoustic modeling system 124 is unable to match the sound pattern of the door bell ring to the sound pattern templates of the door bell category. In this way, the acoustic modeling system 124 is able to match customized noises to one or more categories.

In another example, the audio controlled assistant 104 may be configured to find and play music at the user's request. The default language models 126 and voice commands 110 may cause the acoustic modeling system 124 to identify the voice command "play" followed by a song name as indicating that the acoustic modeling system 124 should cause the music system 120 to locate and stream the song to the audio controlled assistant 104. Over time, the acoustic modeling system 124 may begin to identify that the user 114 typically says "start" followed by a song name instead of "play". As the language models 126 are personalized, the acoustic modeling system 124 is configured to identify "start" as the voice command to play a particular song and may add it to the database of voice commands 110.

Further in a particular implementation, the acoustic modeling system 124 may also recognize that a first user, with a particular voice profile, uses the voice command "start" when requesting a song, while a second user, with another voice profile, uses the voice command "begin". The acoustic modeling system 124 may then cause the song to play when the first user speaks the command "start" and the second user uses says the command "being" but not to play the music if the first user speakers "begin" or the second user says "start". Thus, the acoustic modeling system 124 personalizes the voice commands 110 applied by the audio controlled assistant 104 per user.

Illustrative Systems

Figure 2:
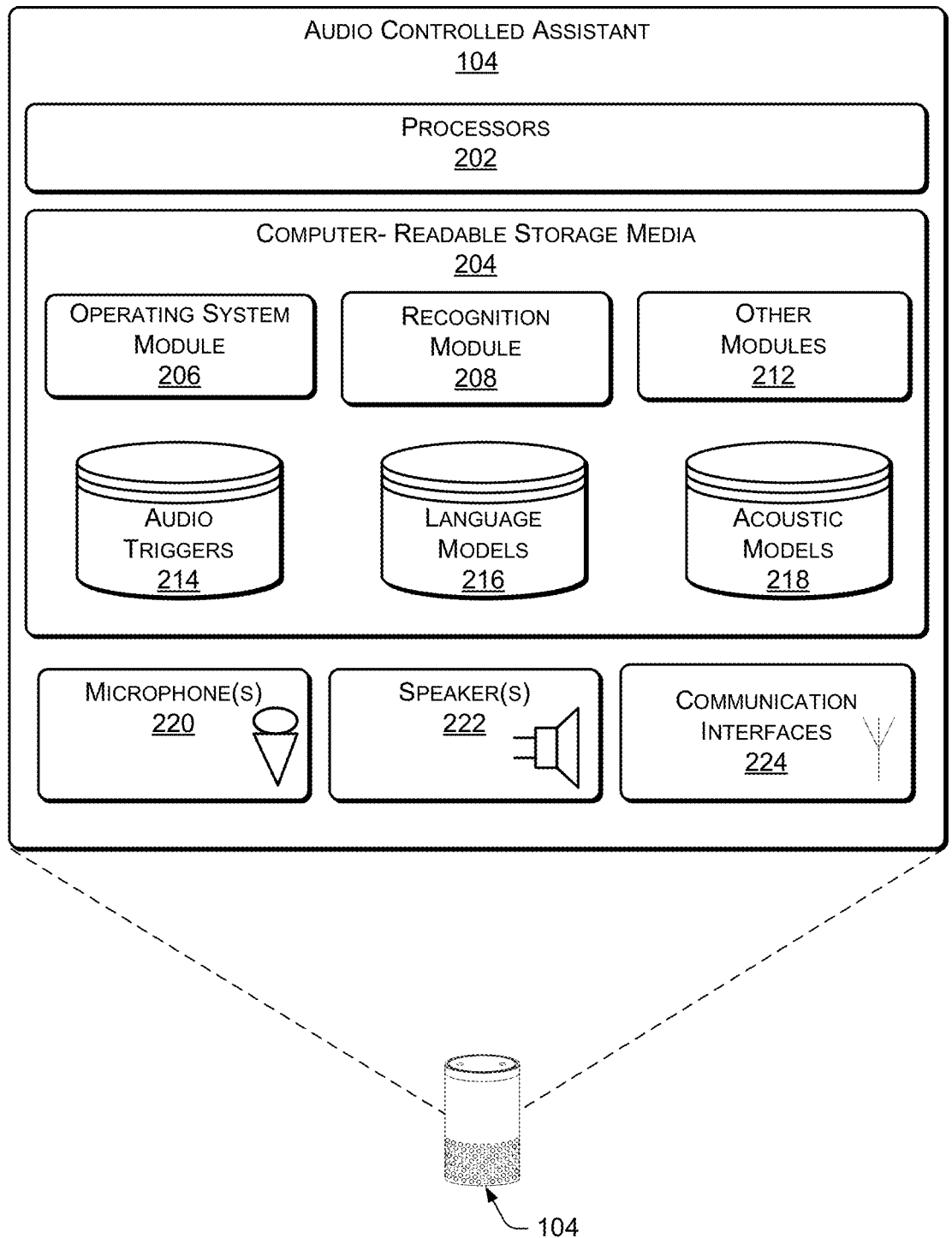
FIG. 2 illustrates a block diagram of selected functional components implemented in the audio controlled assistant of FIG. 1.

FIG. 2 shows selected functional components of the audio controlled assistant 104 in more detail. Generally, the audio controlled assistant 104 may be implemented as a standalone device that is relatively simple in terms of functional capabilities with limited input/output components, memory and processing capabilities or as part of a larger electronic system.

In one implementation, the audio controlled assistant 104 may not have a keyboard, keypad, or other form of mechanical input. The audio controlled assistant 104 may also be implemented without a display or touch screen to facilitate visual presentation and user touch input. Instead, the assistant 104 may be implemented with the ability to receive and output audio, a network interface (wireless or wire-based), power, and limited processing/memory capabilities.

In the illustrated implementation, the audio controlled assistant 104 includes, or accesses, components such as at least one control logic circuit, central processing unit, one or more processors 202, in addition to one or more computer-readable media 204 to perform the function of the audio controlled assistant 104. Additionally, each of the processors 202 may itself comprise one or more processors or processing cores.

Depending on the configuration of the audio controlled assistant 104, the computer-readable media 204 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 202.

Several modules such as instruction, data stores, and so forth may be stored within the computer-readable media 204 and configured to execute on the processor 202. An operating system module 206 is configured to manage hardware and services (e.g., communication interfaces, microphones, and speakers) within and coupled to the audio controlled assistant 104 for the benefit of other modules. A recognition module 208 provides at least some basic recognition functionality. In some implementations, this functionality may be limited to specific commands or prompts that perform fundamental tasks like waking up the device, configuring the device, cancelling an input, and the like. In other implementations, the functionality may be expanded to include performing at least some of the tasks described above with respect to cloud services 106 of FIG. 1.

The amount of recognition capabilities implemented on the audio controlled assistant 104 is an implementation detail, but the architecture described herein supports having some recognition at the audio controlled assistant 104 together with more expansive recognition at the cloud services 106. Various, other modules 212 may also be stored on computer-readable storage media 204, such as a configuration module or to assist in an automated initial configuration of the audio controlled assistant 104, as well as reconfigure the audio controlled assistant 104 at any time in the future.

The computer-readable media 204 also stores one or more audio triggers 212, in addition to at least some limited language models 216 and acoustic models 218. In one implementation, the audio triggers 216 may be one or more words or noises which cause the audio controlled assistant 104 to "wake up" or begin transmitting audio signals to the cloud services 106. For example, the audio triggers 216 may include specific audio prompts or voice commands which when detected by the audio controlled assistant 104 cause the audio controlled assistant 104 to connect and provide the audio signals 116 to the cloud service 106. In another example, the audio triggers 216 may be a collection of voice commands and/or audio prompts. In at least one example, the audio triggers 216 may be the complete set of voice commands 110 and audio prompts 112 available to the acoustic modeling system 124 of FIG. 1.

The audio controlled assistant 104 also includes one or more microphones 220 to capture audio, such as user voice commands and/or audio prompts. The microphones 220 may be implemented as a single omni-directional microphone, a calibrated microphone group, more than one calibrated microphone group, or one or more microphone arrays. The audio controlled assistant 104 also includes one or more speakers 222 to output audio signals as sounds.

The audio controlled assistant 104 includes one or more communication interfaces 224 to facilitate a communication between the cloud services 106 and the audio controlled assistant 104 via one or more networks. The communication interfaces 224 may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interfaces 224 may allow the user 110 to conduct a telephone conference with one or more other individuals.

Generally, the audio controlled assistant 104 captures environmental noise from the acoustic environment 102 using microphones 220, and converts the captured environmental noise into audio signals, such as the audio signals 116. The audio controlled assistant 104 monitors the audio signals for one or more of the audio triggers 216 using the recognition model 208, language models 216 and acoustic models 218. For instance in the illustrated example, the recognition model 208 may be configured to utilize the language models 216 and the acoustic model 218 to detect the audio triggers 216 but the audio controlled assistant 104, in this example, is not configured to perform the model training methods to personalize the language models 216 and the acoustic models 218. Rather in this example, the model training is performed by the acoustic modeling system 120 at the cloud services 106.

In another example, the audio controlled assistant 104 may be configured to analyze the audio signals using one or more model training methods to personalize the language models 216 and the acoustic models 218 and generate personalized voice commands and audio prompts. In this example, the acoustic modeling is preformed directly on the audio controlled assistant 104 rather than by the acoustic modeling system 124 at the cloud services 106, as described above but otherwise operates in a similar manner.

In the illustrated implementation, the audio controlled assistant 104 begins to transmit the audio signals to the cloud services 106 via one or more of the communication interfaces 224 upon detecting one or more of the audio triggers 216. For example, the audio controlled assistant 104 may be configured to monitor the environmental noise but not to provide the audio signals to the cloud services 106 until one or more audio triggers 216 are detected to protect the privacy of user 110. In some instances, the audio triggers 216 may be the audio prompts 112 or voice commands 110 of FIG. 1. In this instance, the audio controlled assistant 104 may detect that an audio prompt or voice command was issued but provide the audio signals to the acoustic modeling system 124 to determine the identity of the specific audio prompt or voice command and to select an appropriate response.

Figure 3:
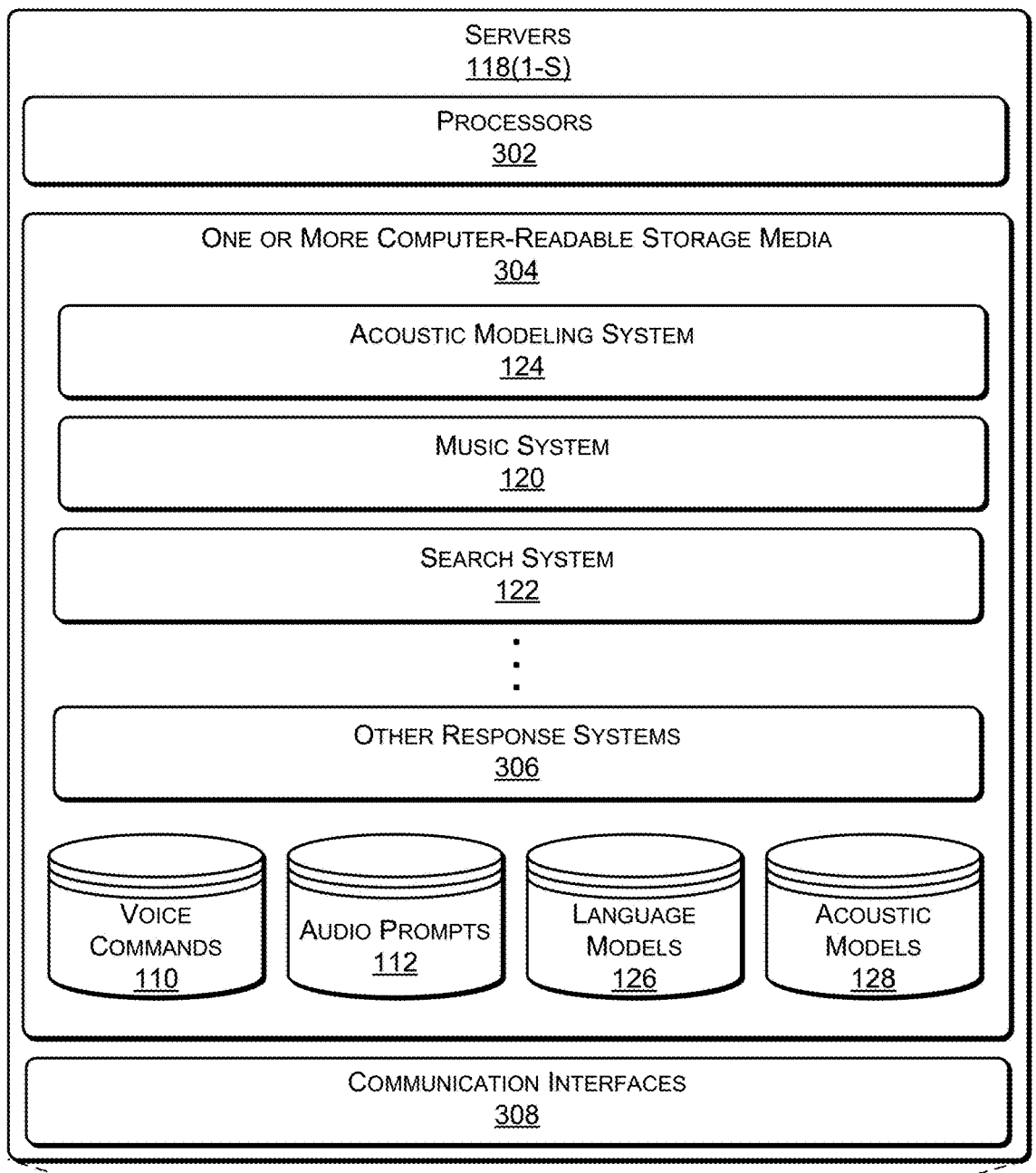
FIG. 3 illustrates a block diagram of a server architecture implemented as part of the cloud-based services of FIG. 1.
Figure 3:
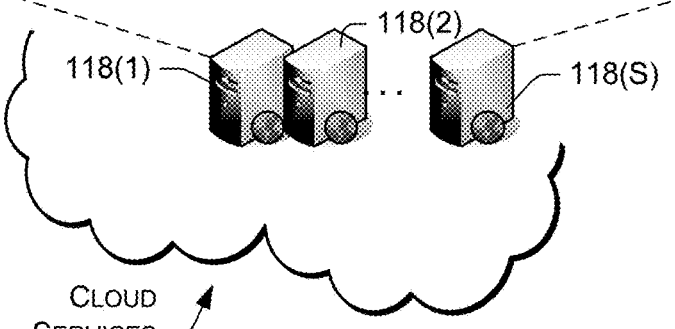

FIG. 3 shows selected functional components of a server 114(1-S) architecture implemented as part of the cloud services 106 of FIG. 1. The servers 118(1-S) collectively comprise processing resources, as represented by processors 302, and computer-readable storage media 304. The computer-readable storage media 304 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

In the illustrated implementation, the acoustic modeling system 124, music system 120, and search system 122, in addition to various other response systems 306, are shown as software components or computer-executable instructions stored in the computer-readable storage media 304 and executed by one or more processors 302. The computer-readable storage media 304 is also illustrated as storing voice commands 110, audio prompts 112, language models 126 and acoustic models 128 accessible by the acoustic modeling system 124.

The servers 118(1-S) also included one or more communication interfaces 308, which may support both wired and wireless connection to various networks, such as cellular networks, radio, WiFi networks, short-range or near-field networks (e.g., Bluetooth®), infrared signals, local area networks, wide area networks, the Internet, and so forth. For example, the communication interfaces 312 may allow the audio controlled assistant 104 to communicate with the acoustic modeling system 120 to process and perform various tasks, such as streaming music from music system 120.

In general, the servers 118(1-S) are configured to receive audio signals, such as audio signals 116, from the audio controlled assistant 104. The acoustic modeling system 124 is configured to utilize the language models 126 and the acoustic models 128 to identify or detect one or more voice commands 110 and audio prompts 112 from the audio signals 116. The acoustic modeling system 124 is able to cause either the audio controlled assistant 104 or one of the other response systems 306 to perform any number or types of operations to complete the task indicated by an identified voice commands 110 or audio prompts 112. For example, the acoustic modeling system 124 may be configured to cause the cloud services 106 to perform database searches via search system 122, locate and consume/stream entertainment (e.g., games, music, movies and/or other content, etc.) via music system 120, aid in personal management tasks (e.g., calendaring events, taking notes, etc.), assist in online shopping, or conduct financial transactions in response to detecting a voice command 110. In another example, the acoustic modeling system 124 may be configured to cause the audio controlled assistant 104 to restart an online purchase transaction in response to detecting an audio prompt 112, such as a period of silence following a phone conversation.

In one particular example, the acoustic modeling system 124 is configured to monitor the audio signals for the voice commands 110 while the acoustic modeling system 124 identifies that the audio signals includes speech and to only monitor the audio signals for audio prompts 112 when the audio signals are free of speech. For instance, the acoustic modeling system 124 may analyze the audio signals using the language models 126 to identify if the audio signals include speech and, if so, to monitor the audio signals for voice commands 110. However, if the acoustic modeling system 124 determines that the audio signals do not include speech, then to monitor the audio signals for audio prompts 112 based on the acoustic models 128.

In another implementation, the acoustic modeling system 124 may utilize the language models 126 to detect the voice commands 110 as discussed above but to utilize the acoustic models 128 to analyze background noise to detect audio prompts 112. For instance, to determine an acoustic scene (or activity that is being performed in the acoustic environment). For example, the acoustic modeling system 124 may monitor the background noise for clinks typically associated with silver and dishware. This may indicate that there is a dinner party taking place in the acoustic environment. Upon detection, the servers 118 may select music to enhance the dinner party and cause the music to be played by the voice controlled assistant or cause the voice controlled assistant to suppress incoming calls by sending them to voicemail, as to not interrupt the party.

The acoustic modeling system 124 may filter foreground noise out of the audio signals and monitor the foreground noise for the voice commands 110 using the language models 126. The acoustic modeling system 124 may also monitor the remaining background noise using the acoustic models 128 to detect audio prompts 112 associated with acoustic scenes, such as the dinner party described above. In this example, each of the audio prompts 112 may represent more than one noise such as a series of noises or a group of noises associated with a single activity.

The acoustic modeling system 124 is also configured to select, generate, update and personalize voice commands 110, the audio prompts 112, and the language models 126 and the acoustic models 128 based on the audio signals received. For example, the acoustic modeling system 124 may be configured to utilize feedback loops or other machine learning techniques to analyze the environmental sounds and personalize the language models 126 and acoustic models 128 to the acoustic environment associated with the transmitting audio controlled assistant 104. For instance, the acoustic modeling system 124 may apply speaker adaptation methods, vocal tract normalizations, or vocabulary adaptation techniques to personalize the language models 126 and the acoustic models 128.

Illustrative Processes

Figure 4:
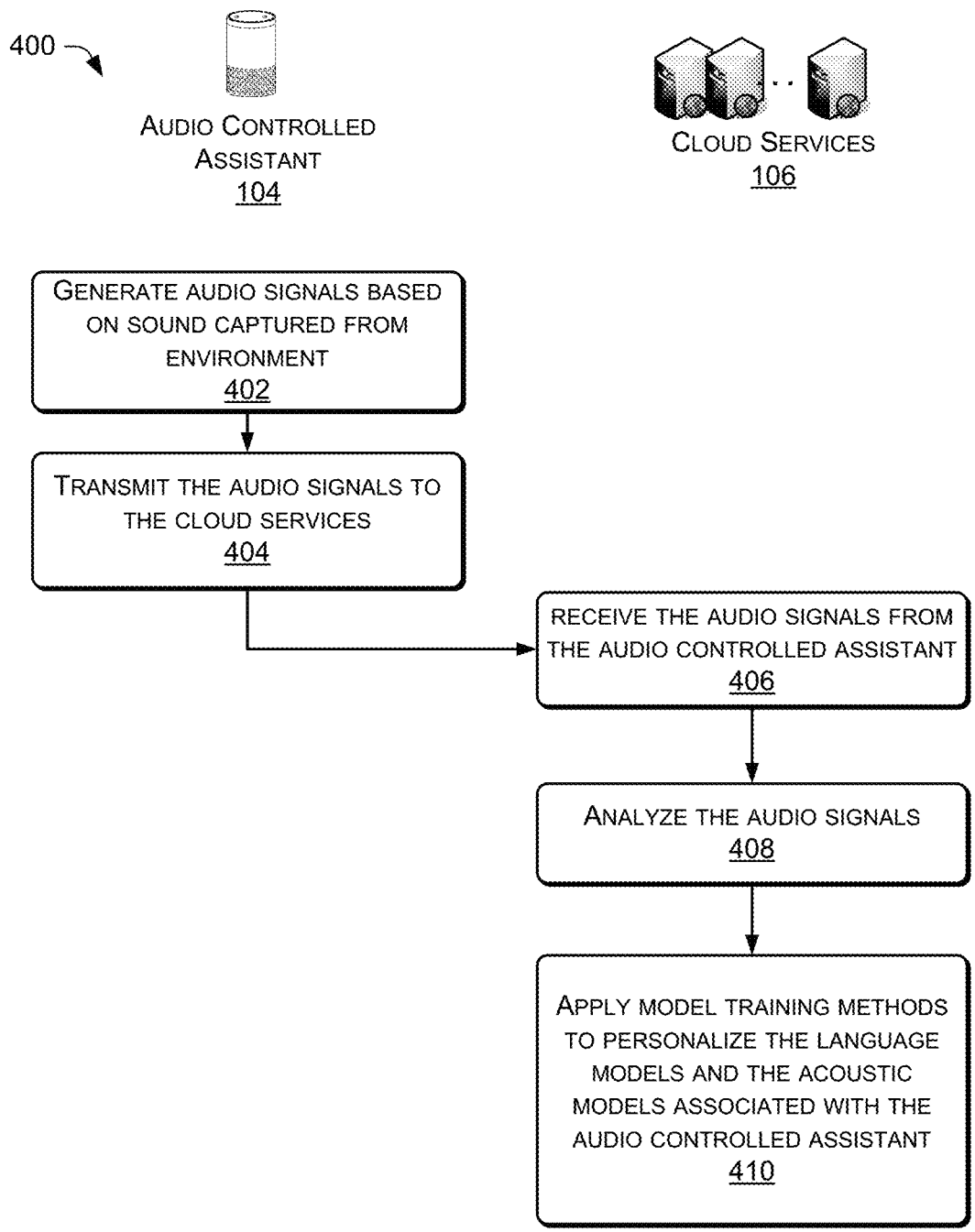
FIG. 4 is a flow diagram illustrating a process of personalizing language and acoustic models for an acoustic environment associated with an audio controlled assistant.
Figure 5:
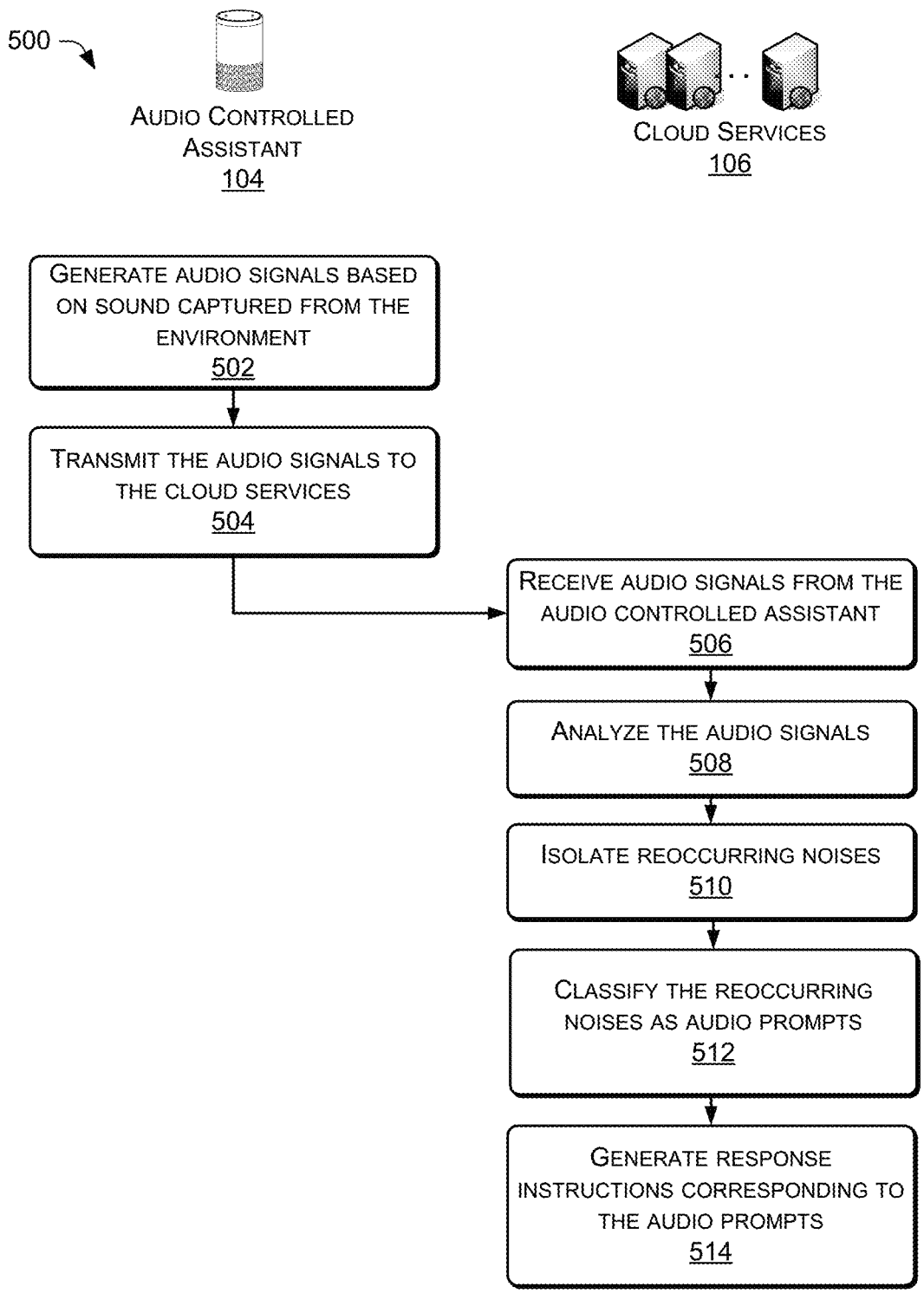
FIG. 5 is a flow diagram illustrating a process of personalizing voice commands and audio prompts of the acoustic environment associated with an audio controlled assistant.
Figure 6:
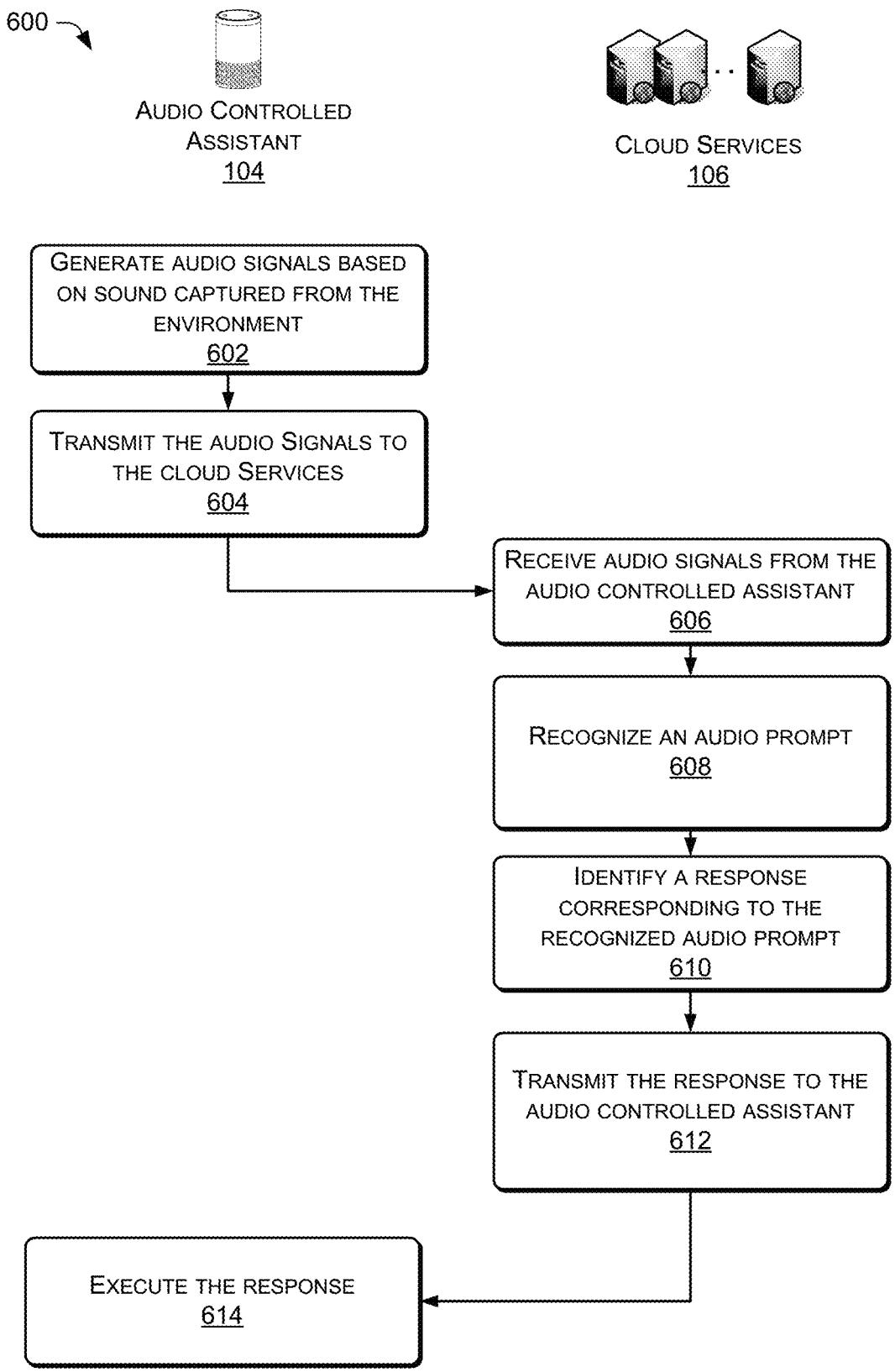
FIG. 6 is a flow diagram illustrating a process of detecting an audio prompt in an acoustic environment associated with an audio controlled assistant.

FIGS. 4, 5 and 6 are flow diagrams illustrating example processes for personalizing and detecting voice commands and audio prompts to a specific acoustic environment associated with a particular audio controlled assistant. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

For purposes of describing one example implementation, the blocks are arranged visually in FIGS. 4, 5 and 6 in columns beneath the audio controlled assistant 104 and cloud services 106 to illustrate what parts of the architecture may perform these operations. That is, actions defined by blocks arranged beneath the audio controlled assistant may be performed by the assistant, and similarly, actions defined by blocks arranged beneath the command response system may be performed by the system.

FIG. 4 is a flow diagram illustrating a process 400 for personalizing language and acoustic models for an acoustic environment, such as acoustic environment 102, associated with an audio controlled assistant, such as audio controlled assistant 104. At 402, the audio controlled assistant 104 generates audio signals, such as audio signals 116, based on sound captured from the acoustic environment 102. The audio signals may include voice commands and/or audio prompts, which are intended to cause the audio controlled assistant to perform various tasks.

At 404, the audio controlled assistant 104 transmits the sounds signals to various cloud services, such as the cloud services 106. The cloud services 106 include at least an acoustic modeling system, such as acoustic modeling system 124. The acoustic modeling system 124, as described above, is configured to apply model training methods to personalize language models and acoustic models associated with the audio controlled assistant 104.

At 406, the cloud services 106 receive the audio signals from the audio controlled assistant 104. At the cloud services 106 various applications and/or systems may perform tasks to respond to voice commands and/or audio prompts identified within the audio signals. For example, the cloud services 106 may includes applications or access systems to perform database searches, locate and consume/stream entertainment (e.g., games, music, movies and/or other content, etc.), aid in personal management tasks (e.g., calendaring events, taking notes, etc.), assisting in online shopping, conducting financial transactions, and so forth.

At 408, the acoustic modeling system 124 of the cloud services 106 analyzes the audio signals 408. For example, the acoustic modeling system 124 may be configure to identify the voice commands and audio prompts based on one or more language models and/or acoustic models associated with the transmitting audio controlled assistant 104.

At 410, the acoustic modeling system 124 of the cloud services 106 applies model training methods to personalize the language models and the acoustic models associated with the transmitting audio controlled assistant 104. For example, the acoustic modeling system 124 may transcribe the audio signals into text then feed the transcribed text into a machine learning model, which utilizes the transcribed text to update the acoustic models. In another example, the transcribed text may be utilized with an n-gram system to improve the recognition accuracy by reducing variability in the n-gram selection.

FIG. 5 is a flow diagram illustrating a process 500 of personalizing voice commands and audio prompts to an acoustic environment, such as acoustic environment 102, associated with an audio controlled assistant, such as audio controlled assistant 104. At 502, the audio controlled assistant 104 generates audio signals, such as audio signals 116, from the acoustic environment 102. The audio signals may include voice commands and/or audio prompts, which are intended to cause the audio controlled assistant to perform various tasks.

At 504, the audio controlled assistant 104 transmits the sounds signals to various cloud services, such as the cloud services 106. The cloud services 106 include at least an acoustic modeling system, such as acoustic modeling system 124. The acoustic modeling system 124, as described above, is configured to generate personalized audio prompts for the acoustic environment 102 associated with the audio controlled assistant 104.

At 506, the cloud services 106 receive the audio signals from the audio controlled assistant 104. At the cloud services 106 various applications and/or systems may perform tasks to respond to voice commands and/or audio prompts identified within the audio signals. For example, the cloud services 106 may include applications or access systems to perform database searches, locate and consume/stream entertainment (e.g., games, music, movies and/or other content, etc.), aid in personal management tasks (e.g., calendaring events, taking notes, etc.), assisting in online shopping, conducting financial transactions, and so forth.

At 508, the acoustic modeling system 124 of the cloud services 106 analyzes the audio signals. For example, the acoustic modeling system 124 may be configure to identify reoccurring or common noises within the audio signals based language models, acoustic models and/or predefined classes or category of noises associated with specific events.

At 510, the acoustic modeling system 124 of the cloud services 106 isolates the reoccurring and common noises from the audio signals. For example, the acoustic modeling system 124 may isolate a portion or segment of the audio signals that repeats. In another example, the acoustic modeling system 124 may isolate noises from the audio signals when the acoustic pattern matches predefined sound pattern templates corresponding to a class or category of noises associated with specific events.

At 512, the acoustic modeling system 124 classifies the reoccurring noises as an audio prompts, which should elicit specific responses when one of the reoccurring noises is detected in the future. For example, the acoustic modeling system 124 may classify a particular song as a ring tone and cause the audio controlled assistant 104 to pause operations when the song is identified. In one particular example, the acoustic modeling system 124 may classify the reoccurring noises in the same manner as words are classified into voice commands. For instance, the noises such as a doorbell, laughter, or even silence may be configured to resemble a word in the language models and then the noise may be added to the list of voice commands. In this example, the acoustic models and language models may be combined, as well as the voice commands and audio prompts.

At 514, the acoustic modeling system 124 generates response instructions corresponding to the audio prompts that were defined. For example, the acoustic modeling system 124 may generate response instructions based on the matching class or category. In other examples, the acoustic modeling system 124 may cause the audio controlled assistant 104 to iterate a number of user-selectable response instruction and assign the selected instructions as the response for a particular audio prompt.

FIG. 6 is a flow diagram illustrating a process 600 of detecting an audio prompt in an acoustic environment, such as acoustic environment 102, associated with audio controlled assistant 104. At 602, the audio controlled assistant 104 generates audio signals from the acoustic environment 102. The audio signals may include voice commands and/or audio prompts, which are intended to cause the audio controlled assistant to perform various tasks.

At 604, the audio controlled assistant 104 transmits the sounds signals to various cloud services, such as the cloud services 106. The cloud services 106 include at least an acoustic modeling system, such as acoustic modeling system 124. The acoustic modeling system 124, as described above, is configured to identify audio prompts and voice commands located within the audio signals and to cause the cloud service 106 or the audio controlled assistant 104 to perform various actions to respond to the audio prompt or the voice command.

At 606, the cloud services 106 receive the audio signals from the audio controlled assistant 104. At 608, the acoustic modeling system 124 of cloud services 106 recognizes one or more audio prompts within the audio signals. For example, the acoustic modeling system 124 may be configure to identify the audio prompts based on one or more acoustic models that have been personalized for the acoustic environment 102 associated with the transmitting audio controlled assistant 104.

At 610, the acoustic modeling system 124 of the cloud services 106 identifies a response corresponding to the recognized audio prompt. For instance, the acoustic modeling system 124 may cause the cloud services 106 to perform tasks to respond to the audio prompt. In one example, the acoustic modeling system 124 may cause one of the cloud services 106 to contact 911 in response to detecting an audio prompt associated with a home alarm.

At 612, the acoustic modeling system 124 transmits response instruction to the audio controlled assistant 104, if the identified response indicates that the audio controlled assistant 104 should perform an action. For example, the acoustic modeling system 124 transmit response instruction which cause the audio controlled assistant 104 to pause or attenuate music in response to detecting a ring tone.

At 614, the audio controlled assistant 104 executes the response instructions and performs the identified response. For example, restarting a online purchase transaction in response to determining that the user has completed an interrupting conversation.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
    receiving a first signal representative of sound detected by a first device associated with a user account and within a physical environment, the sound including a non-conversational noise, wherein the non-conversational noise is different than a conversational noise detectable by the first device;
    analyzing the non-conversational noise with respect to a category of noise;
    determining that at least a portion of the non-conversational noise corresponds to the category of noise;
    sending, in response to the determining, data over a network to a second device associated with the user account, the data causing the second device to output a notification and an option to perform an action; and
    sending additional data to the first device to cause the first device to compare detected noises with a previously identified non-conversational noise.

2. The method of claim 1, further comprising determining that the non-conversational noise is within a threshold of similarity to the previously identified non-conversational noise.

3. The method of claim 1, further comprising:
    receiving, prior to receiving the first signal, a second signal representative of a second sound detected by the first device, the second sound including the conversational noise;
    detecting an audio trigger within the conversational noise; and
    wherein sending the additional data to the first device to cause the first device to compare the detected noises with the previously identified non-conversational noise is at least partly in response to detecting the audio trigger.

4. The method of claim 1, further comprising:
    receiving, prior to receiving the first signal, a second signal representative of a second sound detected by the first device;
    determining the second signal is free of conversational noise; and
    wherein sending the additional data to the first device to cause the first device to compare the detected noises with the previously identified non-conversational noise is at least partially in response to determining the second signal is free of conversational noise.

5. The method of claim 1, wherein the category of noise comprises an alarm.

6. The method of claim 1, wherein the non-conversational noise has no meaning within a selected vocabulary or dictionary.

7. The method of claim 1, wherein the second device is physically proximate to the first device.

8. The method of claim 1, wherein the second device is remote from the first device.

9. The method of claim 1, wherein the second device is associated with an emergency responder.

10. The method of claim 1, further comprising transmitting at least a portion of the first signal over a network to the second device.

11. A device comprising:
    one or more microphones to generate an audio signal based on sound detected from an environment in which the device is located, the device being associated with a user account;
    one or more communication interfaces;
    one or more processors;
    one or more computer readable storage media storing instructions that, when executed on one or more processors, perform acts comprising:
    receiving data to enable the device to compare detected noises within the audio signal with a previously identified first non-conversational noise, wherein the previously identified first non-conversational noise is different than a conversational noise identifiable by the device;

identifying, within the audio signal, the previously identified first non-conversational noise; and causing, in response to identifying the previously identified first non-conversational noise within the audio signal, output of a second non-conversational noise that is different from the previously identified first non-conversational noise.

12. The device of claim 11, wherein the second non-conversational noise is a siren.

13. The device of claim 11, wherein the acts further comprise causing the one or more communication interfaces to transmit at least a portion of the audio signal.

14. The device of claim 11, wherein the audio signal is a first audio signal and wherein the acts further comprise:

receiving a second audio signal representative of second sound detected by the one or more microphones prior to the first audio signal, the sound including the conversational noise;

detecting an audio trigger within the second audio signal; and sending, in response to detecting the audio trigger, instructions to one or more remote devices to compare the first audio signal with the previously identified first non-conversational noise.

15. The device of claim 11, wherein the audio signal is a first audio signal and wherein the acts further comprise:

receiving a second audio signal representative of a second sound detected by the microphones prior to the first audio signal;

determining that the second audio signal is free of the conversational noise; and sending, in response to determining the second audio signal is free of the conversational noise, instructions to one or more remote devices to compare the first audio signal with the previously identified first non-conversational noise.

16. One or more non-transitory computer readable storage media storing instructions that, when executed on one or more processors, perform acts comprising:

receiving, from a first device associated with a user account, an audio signal representing a sound detected by the first device;

detecting a first non-conversational noise within the audio signal, the first non-conversational noise corresponding to a previously identified non-conversational noise, and wherein the first non-conversational noise is different than a conversational noise detectable by the first device;

transmitting data to a second device associated with the user account, the data to cause the second device to, as a response to the detecting the first non-conversational noise, output a second non-conversational noise that is different from the first non-conversational noise; and sending additional data to the first device to cause the first device to compare detected noises with the previously identified non-conversational noise.

17. The non-transitory computer readable storage media of claim 16, wherein the second non-conversational noise is representative of an alarm and the second device is associated with an emergency responder.

18. The non-transitory computer readable storage media of claim 16, wherein the acts further comprise detecting a match between the first non-conversational noise and the previously identified first non-conversational noise based at least in part on similarity of characteristics of the first non-conversational noise and characteristics of a stored sound pattern template associated with the previously identified non-conversational noise.

19. The non-transitory computer readable storage media of claim 16, wherein the first non-conversational noise and the previously identified non-conversational noise have no meaning within a selected vocabulary or dictionary.

20. The non-transitory computer readable storage media of claim 16, wherein the acts further comprise transmitting data to a third device, the data to cause the third device to perform one or more actions as a response to the detecting the first non-conversational noise and wherein the third device is associated with an emergency responder and the second device is associated with a user of the first device.

* * * * *